Dec. 3, 1968     T. M. ROBERTS     3,413,891
PROFILING MACHINES
Filed May 4, 1966     3 Sheets-Sheet 3
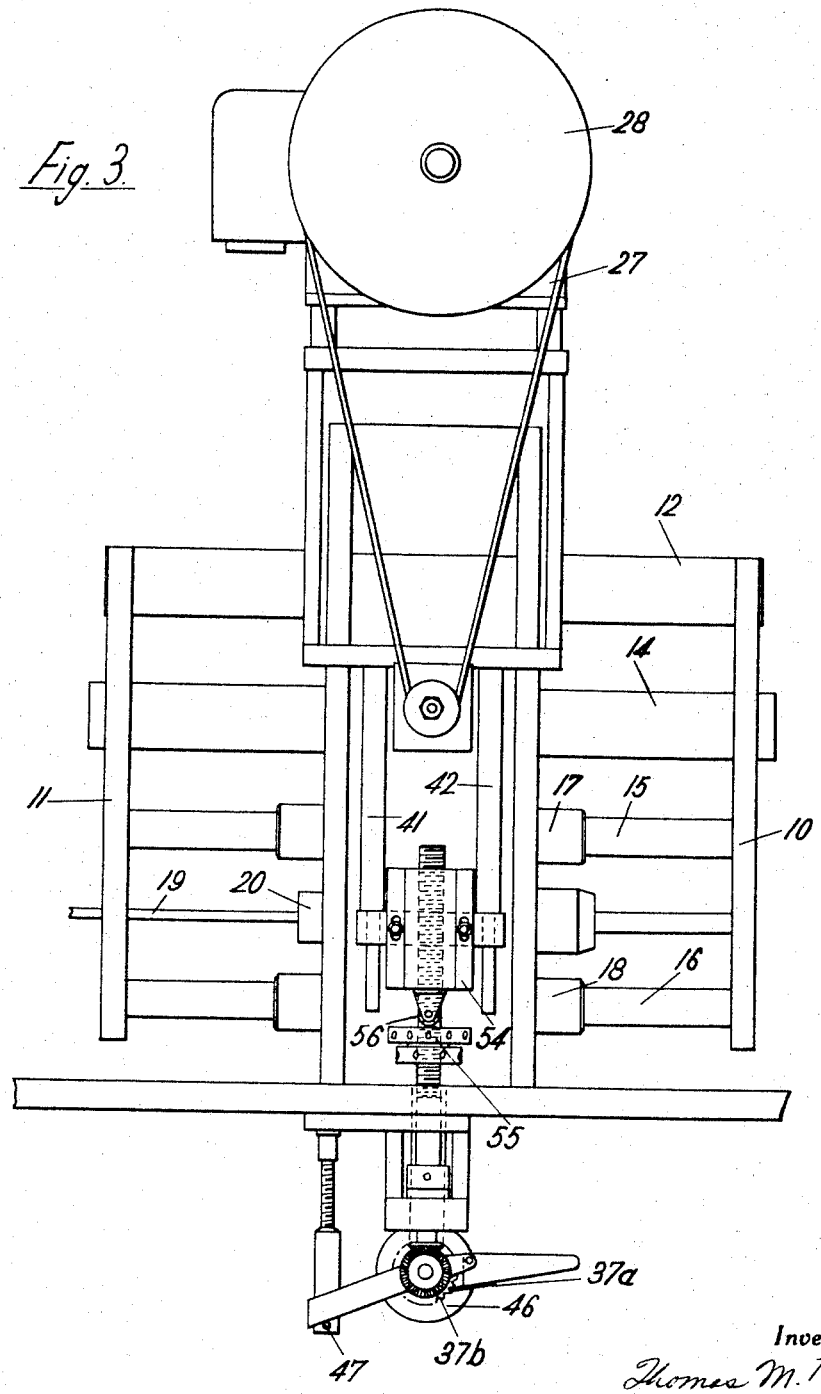

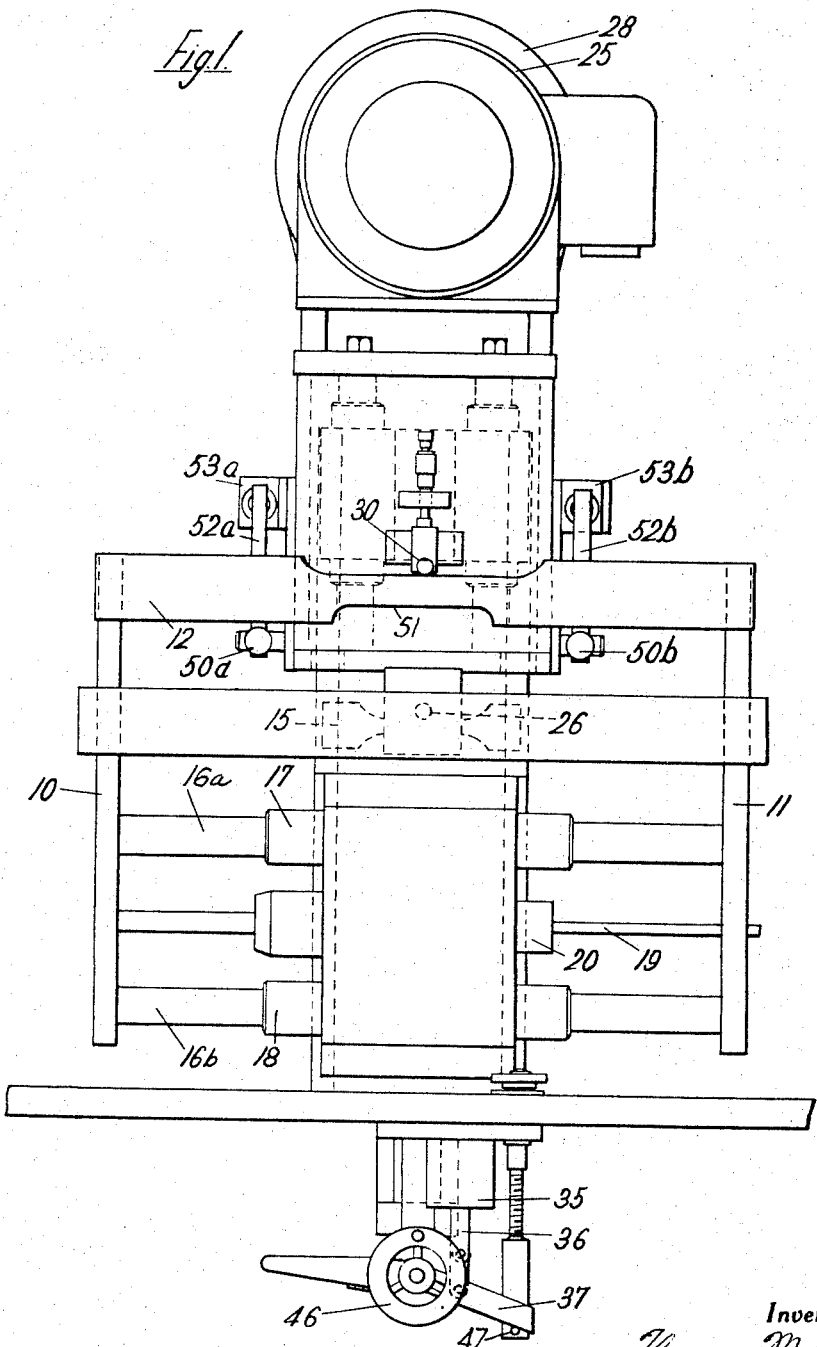

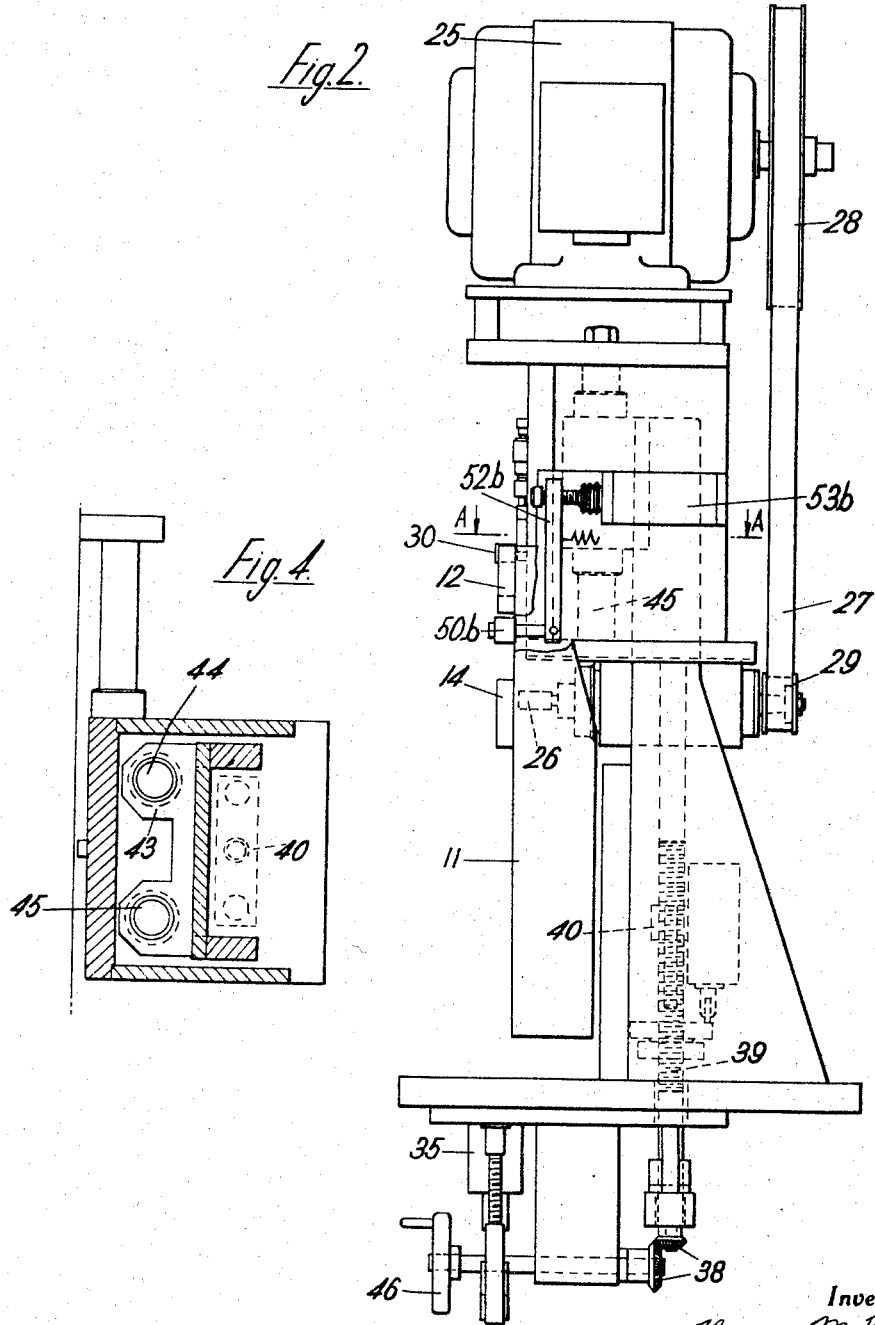

United States Patent Office 3,413,891
Patented Dec. 3, 1968

3,413,891
PROFILING MACHINES
Thomas M. Roberts, Cambridge, England, assignor to British Welding Research Association, London, England, a British body corporate
Filed May 4, 1966, Ser. No. 547,463
Claims priority, application Great Britain, May 6, 1965, 19,195/65
5 Claims. (Cl. 90—13)

ABSTRACT OF THE DISCLOSURE

A profiling machine for the two-dimensional shaping of a component to the same profile as a template. The machine has a horizontally movable assembly for moving the template with respect to a follower and the component to be shaped with respect to a cutter. The follower and cutter are mounted on an assembly which rests on an adjustable stop which is freely movable in an upward direction. The stop is adjusted to lower the follower and cutter assembly and to reverse the direction of horizontal movement whenever the follower strikes the template, the progressive lowering of the stop permitting the cutter to cut more deeply into the component to be shaped in successive transversals.

---

The machining of tensile and fatigue test specimens is a tedious and costly process and in the past they have been produced by milling on a standard vertical milling machine using suitable holding fixtures. However, in addition to its slow speed, this process suffered from the further objection that the cutting forces were quite high, an undesirable feature when machining slender test specimens. Some improvement could be realised by the use of a profile milling machine but the saving in production time would not be very great and the problem of the adverse effect of the high cutting force still remained.

According to the present invention, a profiling machine suitable for making such test specimens includes a first assembly comprising a first carrier for a template to be copied, and a second carrier, fixed in relation to the first carrier, for a component to be shaped to the same profile as the template; a second assembly mounted so as to be freely movable in an upward direction and to have its downward movement limited by an adjustable stop, the second assembly comprising a follower for movement over the template and a high speed rotary cutter fixed relative to the follower, the cutter resting on the component to be shaped when permitted to do so by the adjustable stop; means for achieving relative movement in a horizontal direction between the first and second assemblies and thereby relative movement of the cutter horizontally along the component bar and the follower horizontally over the templaet profile; and means responsive to contact between the follower and the template to stop the horizontal movement, to lower the said adjustable stop, and to start the horizontal movement again in the opposite direction, the progressive lowering of the adjustable stop permitting the cutter to cut more deeply into the component to be shaped in successive traversals. The assembly including the follower and cutter is "floating" and during a cutting stroke, the follower moves above the template and the cutter removes metal as far as permitted by the adjustable stop. The operation ends when the horizontal movement no longer results in loss of contact between the follower and the template. Thus metal is removed from the test piece in horizontal layers, the length of each horizontal stroke being governed by the profile of the template. The high speed rotary cutter is preferably of tungsten carbide.

In the preferred form of invention, a horizontal slide unit carrying the template and the component to be shaped is actuated by a hydraulic cylinder in a reciprocating motion, and the depth of a cut in each transversal of the work is controlled by a solenoid and ratchet lever acting upon a vertical screw and nut.

In order that the invention may be better understood, one example will now be described with reference to the accompanying drawings, in which:

FIGURES 1, 2 and 3 are respectively a front view, side view and rear view of one apparatus embodying the invention; and FIGURE 4 is a sectional view taken on the line A—A of FIGURE 2.

The machine illustrated in the drawing includes a horizontally sliding unit carrying the template or profile bar and component bar and a vertically sliding unit carrying the rotary cutter which shapes the component bar, the follower roller which moves over the profile bar, and an electric motor for driving the cutter.

The horizontally sliding unit includes two vertical end pieces 10 and 11 on which are mounted a profile bar 12, shaped in accordance with the shape of the required component, and a component bar 14 on the back of which there is mounted the component 15 to be shaped. Extending between the side pieces 10 and 11 are shafts 16a and 16b passing through linear slides 17 and 18 and an actuating shaft 19 enters a hydraulic cylinder 20 and is connected to a piston within the cylinder. Oil is admitted alternately to opposite ends of the cylinder to produce reciprocating motion of the piston and consequently of the horizontally sliding unit.

The vertically sliding unit includes an electric motor 25 and a rotary cutter 26 which is driven from the motor by means of a driving belt 27 and pulleys 28 and 29. The vertically sliding unit also includes a follower roller 30 which moves over the profile bar and controls the successive strokes of the shaping operation. Until the final stroke the roller 30 is suspended above the recessed surface of the profile bar and contacts this bar only at the ends of the horizontal strokes. When it contacts the bar it rides up the inclined surface slightly and the lift of the vertical head produced in this manner causes a roller 50a or 50b (depending on which end of the recess is struck) to be brought into contact with the underside of the profile bar, the recess 51 in the underside of the profile bar ensuring that only one of the rollers is affected. The rollers are on bell-crank levers 52a and 52b respectively and the depression of a roller by contact with the profile bar causes movement of its bell-crank lever to operate a micro-switch 53a or 53b. The micro-switches operate solenoid valves to reverse the flow of oil in the hydraulic cylinder 20. The direction of horizontal movement of the profile and component bars with respect to the cutter and follower is thus reversed. Each of these micro-switches also energises a solenoid 35 to cause vertical adjustment of the vertically sliding unit. The armature of the solenoid 35 is connected by a link 36 with a ratchet lever 37 which carries a pawl 37a engaging with a ratchet wheel 37b. When the solenoid is energised at the end of a horizontal stroke the resulting angular movement of the ratchet lever acts through the ratchet wheel and bevel gearing 38 to rotate a vertical lead screw 39 on which a nut 40 engages. The rotation of the lead screw 39 causes downward movement of the nut, the extensions of which support vertical shafts 41 and 42 of the vertically sliding unit. This unit further includes a slide 43 mounted on vertical shafts 44 and 45. The position of the vertical adjustable pin 47 controls the amount of movement of the ratchet lever and therefore the depth of cut.

To use the machine, a profile bar or template 12 is fitted to the horizontal slide and the component to be shaped is clamped to the carrier bar 14 below the template. The vertically moving head is wound to its highest position by means of a hand wheel 46 and the machine is then set in motion. The first horizontal stroke is initiated by admitting oil to the appropriate end of the hydraulic cylinder 20 and at the end of this stroke, when the end portion of the recessed part of the template hits the follower roller, the admission of oil is transferred to the opposite end of the cylinder 20 to reverse the direction of horizontal motion of the bars, and the solenoid 35 is energised to lower the cutter and the follower roller. The next stroke will be slightly shorter in the example shown, owing to the shaping of the ends of the recessed portion. The head continues to be lowered at the end of each stroke until the follower roller contacts the template for the whole of the horizontal stroke of the latter. A lower limit switch 54 terminates the action of the machine, the position of a nut 55, which is contacted by a roller 56 attached to the limit switch, controlling the point of termination.

In manufacturing a tensile test specimen, the template and the component which is being shaped are then removed, reversed and replaced in the machine, after which the operation is repeated. This ensures that any errors in the first operation of the machine are cancelled in the second with the result that a component with parallel sides can be produced.

The cutter and spindle, which in this example, rotates at about 20,000 r.p.m. are lubricated by an oil mist. The vertically sliding unit is counter-balanced to facilitate its movement.

I claim:

1. A profiling machine including a first assembly comprising a first carrier for a template to be copied and a second carrier fixed in relation to said first carrier for a component to be shaped to the same profile as the template; a second assembly mounted so as to be freely movable in an upward direction comprising a follower for movement over the template and a high speed rotary cutter fixed relative to said follower; an adjustable stop limiting downward movement of said second assembly so that said cutter rests on the component to be shaped when permitted to do so by said adjustable stop; driving means for achieving relative movement in a horizontal direction between said first and second assemblies and thereby relative movement of said cutter horizontally along the component bar and said follower horizontally over the template profile; and control means responsive to contact between said follower and template to stop the horizontal movement, to lower said adjustable stop, and to start the horizontal movement again in the opposite direction, the progressive lowering of said adjustable stop permitting said cutter to cut more deeply into the component to be shaped in successive traversals.

2. A profiling machine in accordance with claim 1, in which the second assembly is mounted for vertical sliding movement with respect to the first assembly and in which the vertical movement of the second assembly, caused when the follower contacts the specimen being copied, operates an electric switch.

3. A profiling machine in accordance with claim 2, including a solenoid which is energised by the operation of the switch and which rotates through a predetermined angle a vertical screw on which is mounted a nut attached to the said second assembly, whereby the second assembly is lowered by a predetermined amount.

4. A profiling machine in accordance with claim 2, in which the said horizontal movement is produced by the movement of a piston within a cylinder and in which a valve controlled by the said electric switch reverses the direction of horizontal movement.

5. A profiling machine in accordance with claim 1, including a vertical screw and nut mounted on said screw and constituting said adjustable stop, and further including a solenoid for rotating said screw through a predetermined angle and an electric switch operated when said follower contacts the template for energising said solenoid.

References Cited

UNITED STATES PATENTS

| 2,531,340 | 11/1950 | Mathys | 51—100 |
| 2,782,568 | 2/1957 | Cafolla et al. | 51—100 |
| 3,237,492 | 3/1966 | Massey | 82—14 |
| 3,240,243 | 3/1966 | Golick | 143—158 |
| 3,289,539 | 12/1966 | Sieburg | 51—100 |

GERALD A. DOST, *Primary Examiner.*